No. 828,563. PATENTED AUG. 14, 1906.
J. MILLER, Jr.
NUT GRINDING DEVICE.
APPLICATION FILED JAN. 19, 1906.
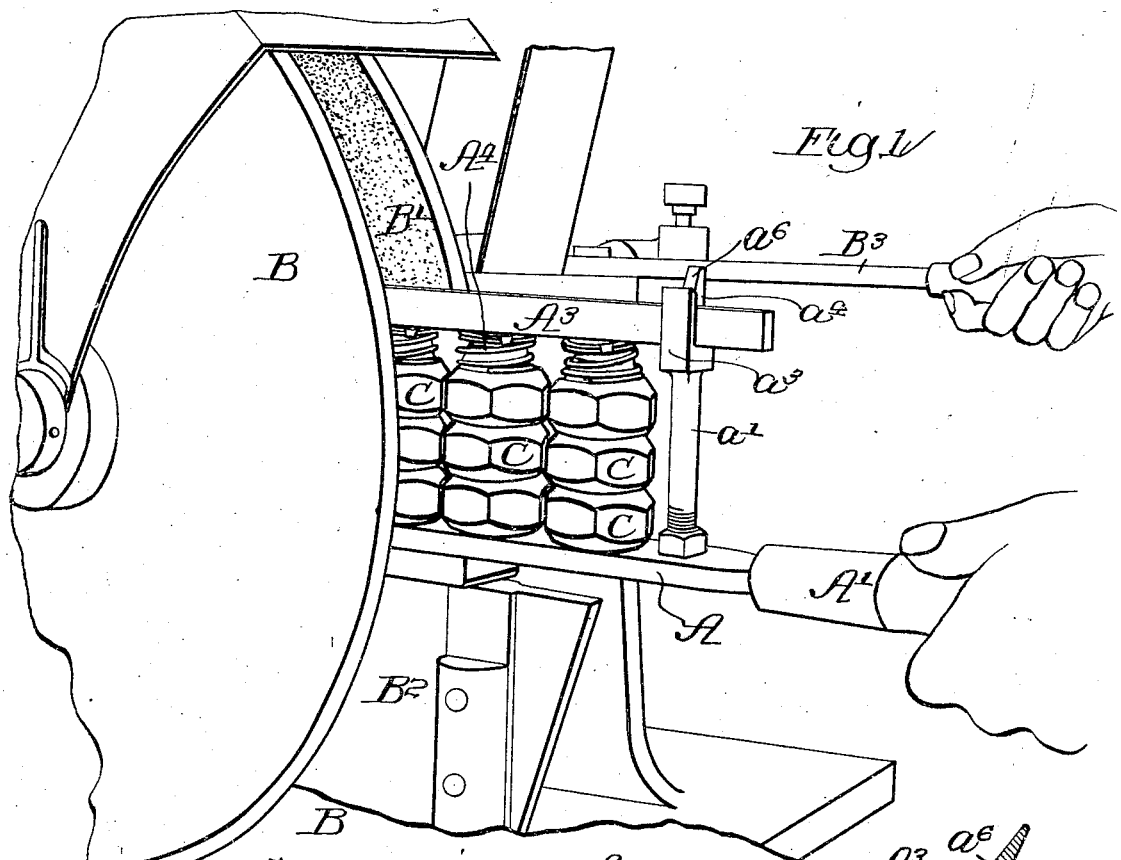
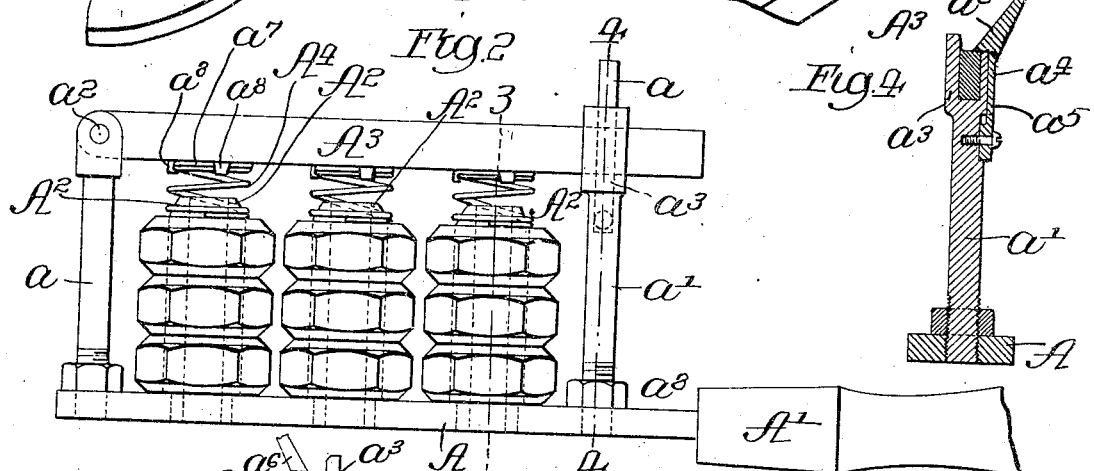
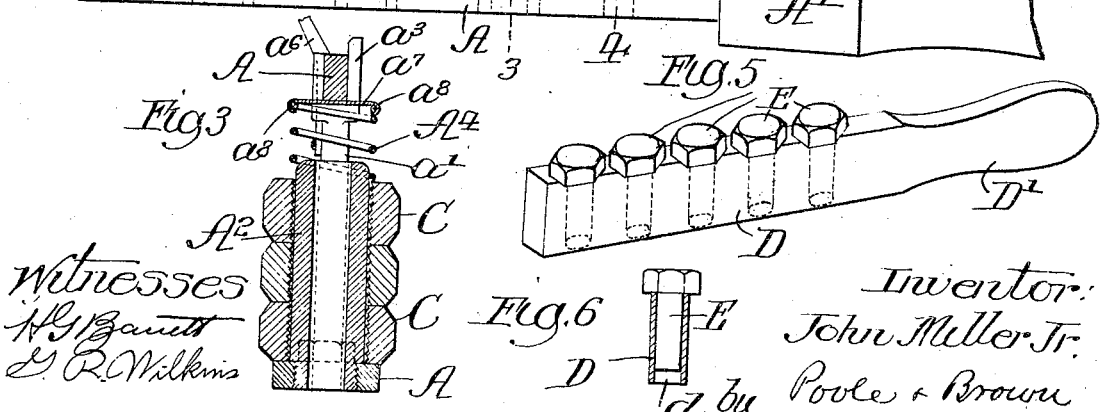
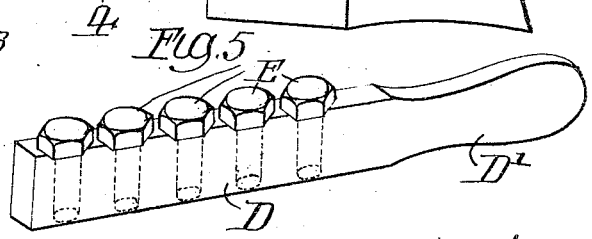
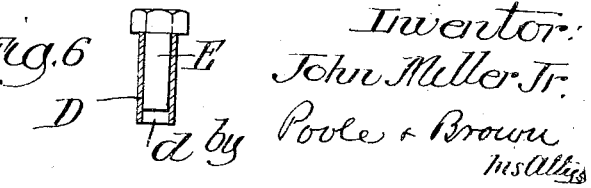
Witnesses
Inventor:
John Miller Jr.
by Poole & Brown
his Attys

UNITED STATES PATENT OFFICE.

JOHN MILLER, JR., OF BELOIT, WISCONSIN, ASSIGNOR TO CHARLES H. BESLY, OF CHICAGO, ILLINOIS.

NUT-GRINDING DEVICE.

No. 828,563.

Specification of Letters Patent.

Patented Aug. 14, 1906.

Application filed January 19, 1906. Serial No. 296,887.

*To all whom it may concern:*

Be it known that I, JOHN MILLER, Jr., a citizen of the United States, and a resident of Beloit, in the county of Rock and State of Wisconsin, have invented certain new and useful Improvements in Nut-Grinding Devices; and I do hereby declare that the following is a full, clear, and exact description thereof, reference being had to the accompanying drawings, and to the letters of reference marked thereon, which form a part of this specification.

This invention relates to a device adapted to hold a plurality of flat-sided symmetrical articles, such as nuts or bolt-heads, in position for grinding by the use of a rotary grinder having a flat grinding surface or surfaces.

My invention consists in the matters hereinafter described, and more particularly pointed out in the appended claims.

A device embodying my invention consists in its main features of a supporting element or bar narrower than the distance between the opposite side faces of the articles to be ground, having at one end a handle and provided with means for detachably holding or supporting a plurality of the articles in position side by side along the same in such manner that the several articles may be turned or rotated, so as to bring the different flat side faces thereof in position to be acted upon by the grinder.

In the accompanying drawings, illustrating my invention, Figure 1 is a perspective view of a device adapted for holding nuts and parts of a double rotary disk grinding-machine, showing the manner in which the nuts are ground by the action of the adjacent grinding-faces of the two grinding-disks. Fig. 2 is an elevation of the device for holding nuts shown in Fig. 1. Fig. 3 is a cross-section taken on line 3 3 of Fig. 2. Fig. 4 is a cross-section taken upon line 4 4 of Fig. 2. Fig. 5 is a perspective view of a device adapted for holding bolts. Fig. 6 is a cross-section taken on line 6 6 of Fig. 5.

Figs. 1 to 4 of the drawings illustrate a holding device adapted for grinding nuts. In said figures, A indicates the main supporting element or bar of the holding device provided at one end with a handle $A'$. In Fig. 1, B B' indicate the two grinding-disks of a rotary disk grinding-machine, said disks being provided on their adjacent faces with opposite parallel flat grinding-surfaces. In the machine illustrated the disk B' is movable toward and from the disk B. $B^2$ designates a support for the holding device, which is located between the two disks B B' and which is attached to or supported upon a stationary part of the machine-frame. $B^3$ indicates a hand-lever which is employed in machines of this kind for shifting the movable grinding-disk B' toward and from the grinding-disk B and to which the hand of the operator is applied for the purpose of pressing or forcing said disk B' toward the disk B in the operation of grinding opposite flat faces of an article placed between said grinding-disks. $A^2 A^2$ indicate a plurality of studs which are affixed to the bar A and extend from one side of the same. Said studs are arranged in a straight line along the center of the bar A and are parallel with each other. Each of said studs $A^2$ is exteriorly cylindric and is adapted to receive a plurality of nuts or like articles to be ground, such as is indicated by C C C in the drawings, the nuts being placed or strung upon the studs in superposed relation in the manner illustrated. The bar A is made narrower than the distance between the opposite flat faces of the nuts, so that said flat faces project beyond or outside of the side faces of the bar, with the result that the action of the grinding-disks on the flat faces of the nuts is not interfered with by the presence of said bar. The studs $A^2 A^2$ being cylindric and the nuts strung upon the same in the manner described, said nuts may be easily turned on the studs to bring their several faces toward the sides of the bar, as required for grinding the several opposite flat faces in succession. The device shown in said Figs. 1 to 4 includes means for yieldingly holding the nuts from turning on the several studs in such manner that the nuts may be readily turned by the fingers of the operator to bring the different or flat faces thereof in position for the action of the grinding-disks thereon. The devices for this purpose (shown in the said Figs. 1 to 4 of the drawings) are made as follows: $A^3$ indicates a holding-bar arranged parallel with the bar A and exterior to the free ends of the studs $A^2$. Said holding-bar is connected with said bar A by means of two posts $a a'$, rigidly attached to said bar A. The holding-bar $A^3$ is pivoted to the post $a$ by means of a transverse pivot-pin $a^2$, so arranged that the opposite end of said bar $A^3$, which is preferably that nearest the handle $A'$, may be swung toward and from the said bar A. The swinging end of said bar $A^3$ is detachably secured to the post $a'$ by a locking device. Such locking device consists, as shown in the drawings, of a head $a^3$ on the post $a'$, provided with an outwardly-opening notch to receive the holding-bar, as clearly seen in Fig. 4, and a spring-latch $a^4$, secured to the post and adapted to engage the outer surface of the bar in such manner as to hold it within the notch. In the particular construction illustrated the spring-latch $a^4$ has a flat spring $a^5$, attached at its lower end to the post and extending at one side of the head $a^3$, and a detent portion which engages the outer edge of the bar and is provided with a finger-piece $a^6$, by which the latch may be swung out of engagement with the holding-bar when desired. The said holding-bar $A^3$ carries a series of pressure members $A^4 A^4$, arranged severally opposite the free ends of the studs $A^2 A^2 A^2$ and adapted to act on the outermost of the nuts on said studs to hold the several nuts in place on the studs. Said pressure devices $A^4$ are made of yielding or resilient character, so that they will exert yielding pressure on the nuts, and thus hold them from too freely turning on the studs. In the preferred embodiment of my invention illustrated each pressure member $A^4$ consists of a spirally-coiled spring, which is attached to the bar $A^3$ by means of a circular metal disk $a^7$, to which the outer coil of the spring is attached by means of holding-clips $a^8 a^8 a^8$ on said disk, the disk being secured to the inner face of said holding-bar $A^3$. Said coiled springs, constituting the holding or retaining members $A^4$, are shown in the drawings as made large enough in diameter to pass over the outer ends of the studs $A^2$, so that they will press against the outermost nuts placed on said studs in the manner illustrated in the drawings. Preferably the outer or free ends of the studs $A^2$ are made rounded or tapering, both to facilitate the application of the nuts to the studs and to guide the ends of the springs $A^4$ into contact with the nuts when the holding-bar $A^3$ is placed in its holding position. The studs $A^2$ are preferably made hollow or tubular, as shown, in order to avoid undue weight in the device.

In placing the nuts on the nut-holding device described the holding-bar will be first opened or thrown back, the nuts placed on the several studs, and the holding-bar then thrown inward and locked, so as to confine the nuts upon the studs. The several nuts will then be turned so as to bring two opposite flat faces thereof in position parallel with the sides of the bar A. In the grinding operation the holding device, with the nuts thereon, will be placed between the grinding-disks B B', with the bar A resting upon the support $B^2$ and the handle $B^3$ then manipulated to bring the movable disk B' toward the disk B, thereby pressing both disks against the opposite side faces of the nuts and grinding all of them simultaneously. After two faces have been ground on each nut in this manner the holder, with the nuts thereon, will be drawn out from between the disks and all the nuts turned to bring a new set of faces into position for grinding. This operation will be repeated until all of the flat faces on the several nuts have been ground.

In Figs. 5 and 6 is shown a simple form of holder that may be used in grinding the flat faces on the heads of articles, such as bolts having cylindric headed stems. In this instance the device consists of a straight bar D, provided with a handle D' and with a plurality of cylindric apertures $d$, arranged along the center line of the bar. E indicates the bolts to be ground, the cylindric shanks of which are inserted in the holes $d$ and the heads of which rest upon the top of the bar D, the bolts being adapted to be rotated in the holes to bring their different flat faces in position for grinding. It will of course be understood that in the grinding operation the holding device will be so placed between the grinding-disks that the grinding-surfaces thereof will move in a direction to press or carry the articles toward the supporting-bar of the device, so that the action of the disks on the articles will have no tendency to dislodge the articles from the holding devices on said bar.

While I have described the use of my holding device in connection with a double-disk grinder, yet the said holding device may be used in connection with a single-disk grinder or a single-cup grinding-wheel or an emery-ring grinding-machine by pressing the nuts against the grinding-face of the grinder one side at a time.

I claim as my invention—

1. A holding device for the purpose set forth, embracing a supporting-bar narrower than the distance apart of the opposite flat sides of the articles to be ground, and said bar being provided with means affording detachable and rotative connection of said articles therewith.

2. A holding device for the purpose set forth, embracing a supporting-bar narrower than the distance apart of the flat sides of the article to be ground, said bar being provided with means for supporting a plurality of article side by side along the same, adapted to permit rotation of the said articles.

3. A holding device for the purpose set forth, embracing a supporting-bar narrower than the distance apart of the opposite flat sides of the articles to be ground, said bar being provided with means affording detachable and rotative connection of the articles therewith, and with means affording yielding pressure on said articles to hold them from freely turning.

4. A holding device for the purpose set forth, embracing a supporting-bar narrower than the distance apart of the opposite flat sides of the articles to be ground, said bar being provided with means affording detachable and rotative connection of the articles therewith, said supporting-bar being provided a one end with a handle.

5. A holding device for the purpose set forth, embracing a supporting-bar provided with a plurality of cylindric studs arranged longitudinally thereof at one side of the bar and parallel with each other; said bar being narrower than the distance apart of the opposite flat faces of the articles to be ground.

6. A holding device for the purpose stated, comprising a supporting-bar provided with a plurality of studs arranged longitudinally of the bar at one side thereof and parallel with each other, and means for holding nuts or the like on said studs, adapted to act with yielding pressure on said nuts.

7. A device for the purpose set forth, embracing a supporting-bar provided with a plurality of parallel studs arranged along the bar and extending from one side of the same, a holding-bar movably connected with the supporting-bar and arranged opposite the free ends of the studs, and pressing members attached to the holding-bar and adapted to act upon nuts or the like placed upon the studs.

8. A device for the purpose set forth, comprising a supporting-bar provided with a plurality of parallel studs arranged along the bar and extending from one side thereof, a holding-bar movably connected with the supporting-bar and spring pressing members connected with the holding-bar and adapted to act upon the nuts or the like placed upon said studs.

9. A device for the purpose set forth, comprising a supporting-bar provided with a plurality of parallel studs arranged along the bar and extending from one side thereof, and with two posts, a holding-bar pivoted to one of said posts and having detachable connection with the other post, and pressing members attached to the holding-bar and adapted to act upon nuts or the like applied to said posts.

10. A device for the purpose set forth, comprising a supporting-bar provided with a plurality of parallel studs arranged along the bar and extending from one side thereof, and with two posts, a holding-bar pivoted to one of said posts and having detachable connection with the other post, and pressing members attached to the holding-bar and adapted to act upon nuts or the like applied to said posts, said pressing members consisting of spirally-coiled springs attached to the holding-bar and adapted to receive the adjacent ends of the studs.

In testimony that I claim the foregoing as my invention I affix my signature, in presence of two witnesses, this 13th day of January, A. D. 1906.

JOHN MILLER, Jr.

Witnesses:
MARY A. MULAN,
CLAYTON E. UDELL.